United States Patent [19]

Richardson

[11] 4,256,485

[45] Mar. 17, 1981

[54] ENZYME OXIDATION OF SULFIDES IN MINERALS

[75] Inventor: Frederick J. Richardson, Tonasket, Wash.

[73] Assignee: Northwest Ecological Research & Development, Inc., Omak, Wash.

[21] Appl. No.: 83,612

[22] Filed: Oct. 11, 1979

[51] Int. Cl.³ ............................................... C22B 1/11
[52] U.S. Cl. .......................................... 75/6; 44/1 SR; 75/101 R; 75/115; 75/118 R; 201/17; 423/41; 423/87; 423/95; 423/98; 423/106; 423/109; 423/146; 423/150; 423/544; 423/558; 423/563; 423/564; 435/168; 435/262; 435/942
[58] Field of Search ................ 75/1 R, 6, 101 R, 115, 75/118, 1 T; 423/47, 68, 52, 82, 86, 87, 98, 146, 109, 150, 153, 154, 563, 564, 544, 558, 41, 95, DIG. 17; 208/208 R; 44/1 SR; 435/281, 282, 262, 168, 942; 201/17

[56] References Cited

U.S. PATENT DOCUMENTS

| | | | |
|---|---|---|---|
| 2,521,761 | 9/1950 | Strawinski | 435/282 |
| 3,268,414 | 8/1966 | Laine | 435/281 |
| 3,455,679 | 7/1969 | Mayling | 75/103 |
| 3,826,308 | 7/1974 | Whitney | 435/281 |
| 3,959,436 | 5/1976 | Watts | 75/118 R |

OTHER PUBLICATIONS

*Chemical Abstracts* No. 131,983u, vol. 75, p. 137, (1971).
Solozhenkin, P. M.; *Preprint Int. Conf. Chem. Metall.* Paper 37 Bhabha At. Res. Cent; Bombay India (1979).
Detz, C. M.; et al; "Microbrial Desulphurization of Coal", *Mining Congress Journal*, Jul. 1979, pp. 75–86.
*Chemistry Of Coal Utilization* vol. I, John Wiley & Sons, Inc., pp. 428–430.
*Hadih's Chemical Dictionary*, McGraw Hill, pp. 132, 592, 644.

*Primary Examiner*—Michael L. Lewis
*Attorney, Agent, or Firm*—Harvey B. Jacobson

[57] ABSTRACT

A process for treating sulfide ores to reduce the sulfur content or recover the metal content therefrom comprises the use of enzymatic action to solubilize the sulfur and metal content.

A nutrient, such as a saccharide, is used along with yeast spores which feed on the sugar and produce enzymes which act on sulfur in the sulfide ore to cause the sulfur to go into solution and to dissolve those metals which are soluble in strongly acidic solution. Sulfuric acid can be formed from the sulfide ores or from free sulfur by reaction with water, with evolution of hydrogen sulfide gas. Oxidation of at least a portion of the hydrogen sulfide can be achieved to regenerate sulfuric acid.

14 Claims, No Drawings

ENZYME OXIDATION OF SULFIDES IN MINERALS

BACKGROUND OF THE INVENTION

1. Field of the Invention

The invention relates to mineral ore treatment, particularly to oxidation of sulfides in mineral ores by means of enzymes generated from microorganisms. Hydrogen sulfide is produced as a product of the reaction, a portion of which is further oxidized to sulfuric acid. Metal impurities are converted to soluble forms by the sulphuric acid and can then be removed by leaching techniques to leave a concentrate which is high in metal values, such as silver concentrate.

2. Disclosure Statement

The bacterial leaching of mineral ores is known. For example, O'Connor et al in U.S. Pat. No. 3,679,397, patented July 25, 1972, and Mayling, in U.S. Pat. No. 3,455,679, issued July 15, 1969, specifically mention certain bacterial species for carrying metals into solution, and Zaffe in U.S. Pat. No. 3,272,621, patented Sept. 13, 1966, identifies other species of microorganism for a similar purpose. U.S. Pat. No. 3,923,540, issued Dec. 2, 1975, to Usami et al, suggests action of an enzyme produced by a species of bacteria, and further discloses consumption of sulfur or other sulfur compounds by such bacteria.

In U.S. Pat. No. 3,959,436, issued May 25, 1976 to Watts, addition of aqueous hydrogen peroxide to mineral leaching solutions is disclosed, with the additional suggestion of addition of sulfuric acid solutions and elemental sulfur.

Although use of biological systems for effecting mineral leaching can be found in certain of the patents listed above, none discloses specifically the use of yeast or biological material which metabolizes sugar, molasses, starch, or malt, for the purpose of placing mineral contaminants into solution with evolution of hydrogen sulfide or the further oxidation of evolved hydrogen sulfide to sulfuric acid. Moreover, many of the patented processes disclosed produce sulfur, rather than utilize elemental sulfur which has been added to the leach mixture. Accordingly, a need exists for a simple process for removing acid soluble contaminant metals in sulfide rich ores.

SUMMARY OF THE INVENTION

The invention provides a process for enzyme oxidation of water insoluble or substantially water insoluble metal sulfides in mineral ores to give a soluble mineral product with evolution of hydrogen sulfide gas. Enzymes are produced by microorganisms which utilize saccharides, such as sugar, molasses or the like, for growth, or which thrive in malt compositions. Mineral values can then be recovered conventionally from the mineral concentrate remaining after leaching of the metal contaminants carried into solution.

Accordingly, it is an object of the invention to provide a process for enzyme oxidation of free or combined sulfur in mineral ores.

Another object is to provide a process for producing enzymes for oxidation of sulfides by means of microorganisms which grow in a medium containing saccharides such as sugar, molasses, starch, malt, or the like.

Still another object is to provide a process for solubilizing water insoluble or substantially insoluble metal sulfides, oxides, or chlorides of contaminant metals such as zinc, copper, arsenic, antimony, iron, or the like.

A further object is to provide a process in which an oxidizing agent can convert by-product hydrogen sulfide to sulfuric acid for further use in the enzyme oxidation of sulfides or sulfur or for production of concentrated sulfuric acid.

Another further object is to cut shipping costs of ore and to reduce smelter penalties by removing metal contaminants without substantially affecting the quantity or quality of metal values to be ultimately recovered.

These together with other objects and advantages which will become subsequently apparent reside in the details of the processes and compositions as more fully hereinafter described and claimed. Throughout the specification and claims, unless otherwise specified, parts and proportions are expressed in weight percent and temperatures are expressed in degrees Centigrade.

DESCRIPTION OF THE PREFERRED EMBODIMENTS

As sources of higher grade mineral ores become depleted through extensive working of known reserves of such minerals, it becomes increasingly necessary to develop processes for more efficiently utilizing lower grades of minerals if the demand for such metals is to be dependably met.

Typically, metals which contaminate an ore of a more valuable metal are present in the form of sulfides, and may also be present as water insoluble or substantially insoluble oxides or chlorides. It is desired to carry such metal ore contaminants into solution to permit leaching from the metal concentrates for the purposes of reducing the cost of shipping the concentrate, reducing smelter emissions penalties and doing so without affecting substantially the quality or quantity of metal values recoverable. In addition, the possibility exists that one or more of the solubilized metal contaminants can be recovered from the solution and sold as a by-product.

As the basic solution in which a sulfide ore is introduced, a water solution of saccharide material, such as sugar, starch, malt, molasses, or the like is used in a concentration of nutrient sufficient to support growth of yeast. As yeast spores divide and multiply they feed on the saccharide material, resulting in production of enzymes by the yeast. These enzymes act on sulfur in suspended sulfide ore particles and oxidize the sulfur to a soluble form, such as sulphuric acid. As the pH of the solution is lowered, various ore materials are dissolved and furnish a new supply of sulfur for continuing the oxidation catalyzed by enzymes produced by the yeast. Reactions occurring by the processes described include the following:

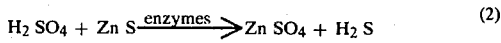

Although reaction (2) specifies zinc sulfide as the paticular metal sulfide shown for illustrative purposes, the reaction can occur for other metal sulfides as well, such as antimony, iron, copper, arsenic, or other contaminant metals well known in the metallurgical art. The zinc sulfate product formed in reaction (2) is soluble in water and can be withdrawn by percolation, leaching, or other well know techniques. As an illustration of a substantially insoluble metal oxide which can be solublized by sulfuric acid produced according to reaction (1), the following reaction is illustrative, also making use of zinc as an example:

$$H_2SO_4 + ZnO \rightarrow ZnSO_4 + H_2O \tag{3}$$

It is frequently the case that iron sulfide in various forms, such as pyrites, is present in mineral ores, enzyme oxidation can be utilized to carry such iron sulfides into solution as iron sulfate. Moreover, in view of the oxidizing potential of ferric sulfate, this material can act to solubilize certain other metals, such as is suggested in U.S. Pat. No. 2,829,964, to Zimmerly et al.

Inasmuch as sulfuric acid is consumed by reaction (3), and inasmuch as sulfuric acid is also required for reaction (2), it is necessary to add sulfuric acid or to provide a method for replenishing the sulfuric acid in the solution used for treating the ores. Accordingly, an oxidizing agent can be added to the solution to convert hydrogen sulfide evolved as a byproduct into sulfuric acid according to the following equation in which hydrogen peroxide is illustrated as the oxidizing agent:

$$H_2S 30\ 4H_2O_2 \rightarrow H_2SO_4 + 4H_2O \tag{4}$$

Use of an oxidizing agent such as hydrogen peroxide illustrated in reaction (4) can reduce the necessity for addition of sulfur, as in reaction (1) or for addition of sulfuric acid necessary in order to promote reaction (2). Other oxidizing materials, such as a commercially available product of the E. I. du Pont de Nemours & Co. sold under the trademark "Oxone" can be used instead of hydrogen peroxide. Such a substance has the advantage that oxidation of hydrogen sulfide can proceed without dilution of the reactive solution, since hydrogen peroxide is commercially available in dilute aqueous solution. The "Oxone" material is an acidic, white granular solid containing as its active ingredient potassium peroxymonosulfate ($K_2SO_5$). This material is readily soluble in water, a 1% solution having a pH of about 2 to 3, with a mimimum active oxygen content of about 4.5%. The material is a strong oxidizing agent and reacts with hydrogen sulfide according to the following reaction:

$$H_2S + 4K_2SO_5 \rightarrow H_2SO_4 + 4K_2SO_4 \tag{5}$$

While the process for leaching metals from sulfide metal ores with the aid of enzymes, as taught by the present invention, can be used on sulfide ores, it is also useful in treatment of coal containing sulfur contaminants, and be used on raw sulfur. Accordingly, the method can be used not only for removing metals in water soluble form and for removing contaminant metals and sulfur from ore concentrates, but can also be used for producing sulfuric acid. When used to lower the sulfur and arsenic content of ores so treated, the process results in reduction of emissions from a smelting process or from coal burning, and reduction of polluting emissions results from combustion of coal, coal-fired furnaces, and the like, thereby assisting in compliance with air pollution control laws.

It is possible to conduct the processes of the present invention with use of microorganisms which are commonly available, and the processes can be carried out at room temperature, thereby necessitating no special heating or pumping equipment. The process can be carried out during a time of only 24 to 72 hours, rather than requiring a period of several days, as is sometimes necessary with known methods of bacterial oxidation of ores.

Sulfur treated by the present process to form sulfuric acid gives a product which can be dehydrated and reconstituted into sulfuric acid at the site of ore treatment, the sulfuric acid being useful for other processes at the site as well. Ores which contain insufficient sulfur can be treated with addition of sulfur to permit reactions (1), (4) and/or (5) to proceed.

Yeast and sugar disappear very quickly when conducting the process, and after the sulfur present has begun to go into solution, the process is self-perpetuating. Metals in the resulting solution can be recovered by known methods, including chemical, electrochemical, and other techniques.

Unlike known processes, involving bacteria, the process of the invention relying on yeast encourages the lowering of pH values to less than 2, and with addition of an oxidizing agent, such as is taught in reaction (4) or (5), the process does not depend upon continued production of enzymes beyond the initial period of a few hours required to start the process. Leaching of mineral values can begin almost immediately after introduction of the yeast and saccharide.

The following examples are intended to illustrate the processes of the invention, the scope of which is intended to be limited not by the examples, but only by the scope of the claims appended hereto.

EXAMPLE 1

Copper sulfide mineral ore containing 26% copper and 3% zinc was treated at room temperature in a leaching tank partially filled with water by introduction of yeast (baker's yeast as used for making bread) and sugar (sucrose) to the water. The mineral ore was present in excess, and hydrogen sulfide gas was evolved, as evidenced by its characteristic odor. After about an hour, noticeable evolution of gas ceased, and the characteristic odor of yeast also disappeared. After about 24 hours, the solution in the liquid phase contained 9.5 grams per liter of copper, and 7 rams per liter of zinc, as measured by atomic absorption techniques and the solution had a pH value of 2 or less, as measured by standard pH paper. The copper content of the ore was reduced to 22% with a substantial lowering of sulfur content.

EXAMPLE 2

The suspended solids from the sample produced in Example 1 were separated from the liquid phase solution, and the supernatant liquid was replaced with an equal volume of water. Within a short time, the pH of the liquid phase fell to 2 or less, indicating the presence of enzymes in sufficient quantity to continue the reactions outlined, even with considerable dilution. The copper content of the solution was measured by atomic absorption at different times and found to fall between 9.5 grams per liter and 11 grams per liter.

EXAMPLES 3

The mixture of ore and liquid phase solution resulting from Example 2 was treated with "Oxone", a trademarked product of E. I. du Pont de Nemours & Co. for potassium peroxymonosulfate. The ore suspension was stirred, and after several hours the solution contained copper measured by atomic absorption technique at 14.5 grams per liter.

EXAMPLES 4

In an effort to determine the minimum amount of yeast and sugar necessary to initiate the reactions outlined herein, one gram of yeast, 3 grams of sugar (sucrose) and one pound of copper ore concentrates were treated in a leaching tank partly filled with water (amounts equivalent to 4.46 lb. yeast and 13.39 lb. of sugar per ton of ore or concentrates). The process was successfully initiated, substantially as described for Example 1.

EXAMPLE 5

A mineral ore coal sample containing metallic appearing yellow iron pyrite (iron sulfide) in significant amounts was measured for sulfur content and found to contain 9.94% sulfur. A portion of the sample was pulverized and placed in a leaching tank for treatment by a yeast and sugar aqueous phase for a period of approximately 12 hours, at room temperature, without agitation. After treatment, the sulfur content of the sample was measured and determined to contain 7.92% sulfur, amounting to approximately a 2.02% sulfur reduction, equivalent to approximately 40.4 lb. of sulfur removed per ton of coal.

EXAMPLE 6

An iron sulfide ore sample is pulverized and covered with a suspension of malt and starch in water. The time required for enzyme formation is somewhat longer than with use of yeast and sugar, but results substantially identical to Example 1 are obtained, except that pH is lowered somewhat further than Example 1.

The Examples indicate that the sulfur content of ores including coal and copper-bearing ore sample can be reduced substantially, and the mineral content can be partially placed into solution by the leaching techniques outlined. The Examples further illustrate the improvement in overall results when a strong oxidizing agent is added in the later stages of treatment, particularly pointing out the advantageous use of potassium peroxymonosulfate, which is preferred over hydrogen peroxide as an oxidizing agent inasmuch as ingredients can be kept in a dry condition until actually needed, thereby reducing shipping and handling costs.

The foregoing is considered as illustrative only of the principles of the invention. Further, since numerous modifications and changes will readily occur to those skilled in the art, it is not desired to limit the invention to the exact process and materials shown and described and accordingly, all suitable modifications and equivalents may be resorted to, falling within the scope of the invention.

What is claimed as new is as follows:

1. A process for treating a solid mineral ore containing one or more contaminants in the form of free or combined sulfur as metal sulfides, comprising the following steps:

(a) reducing or pulverizing the mineral ore to granular or smaller particle size;

(b) forming a mixture of pulverized ore and water at room temperature;

(c) adding microorganisms in the form of baker's yeast or malt and a saccharide to the mixture of ore and water;

(d) allowing the mixture of step (c) to stand for a period sufficient for enzymatic action to carry a significant amount of free or combined sulfur into aqueous solution as sulfuric acid or a metal sulfate; and (e) removing at least a portion of said sulphuric acid or metal sulphate from said aqueous solution.

2. The process of claim 1 wherein the contaminant is selected from the group consisting of a metal sulfide of iron, copper, arsenic, antimony, zinc and mixtures thereof.

3. The process of claim 2 wherein the mineral ore is a silver mineral ore concentrate.

4. The process of claim 1 wherein the mineral ore is a mineral containing primarily coal, and the contaminant is in the form of free or combined sulfur.

5. The process of claim 1, together with the following additional step:

(f) adding to the liquid phase solution of step (d) a water soluble strong oxidizing agent to form a liquid phase product containing sulfuric acid.

6. The process of claim 5 wherein said oxidizing agent is a solution of hydrogen peroxide in water.

7. The process of claim 5 wherein said oxidizing agent is potassium peroxymonosulfate.

8. The process of claim 1 wherein the microorganism is baker's yeast present in a proportion of at least 4.5 lb. per ton of ore and the saccharide is sucrose present in a proportion of at least about 13.4 lb. per ton of ore.

9. The process of claim 1 wherein the ore contains in addition further contaminants in the form of oxides and chlorides of contaminant metals, said oxide and chloride contaminants being taken into solution during step (d).

10. The process of claim 2 wherein the sulfuric acid in liquid phase product is concentrated by removing water and metal sulfates therefrom.

11. The process of claim 4 wherein said free or combined sulfur contaminant is reduced at least about 40.4 lb. per ton of mineral ore, measured as sulfur.

12. The process of claim 2 wherein said mineral ore contains a copper sulfide contaminant comprising 26% copper and said period is 24 hours and wherein said contaminant is reduced from 26% copper to 22% copper with a substantial lowering of sulfur content.

13. The process of claim 12 wherein said contaminant contains 3% zinc in addition, and said aqueous solution formed in step (d) contains about 9.5 grams per liter of copper and about 7 grams per liter of zinc.

14. The process of claim 1 wherein step (b) is performed in an acid resistant leaching tank at room temperature.

* * * * *